(12) United States Patent
Davies et al.

(10) Patent No.: US 8,230,936 B2
(45) Date of Patent: *Jul. 31, 2012

(54) METHODS OF FORMING ACID PARTICLE BASED PACKERS FOR WELLBORES

(75) Inventors: Stephen Davies, Sugar Land, TX (US);
Frank Espinosa, Richmond, TX (US);
John W. Still, Richmond, TX (US);
Jean-Louis Pessin, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 97 days.

This patent is subject to a terminal disclaimer.

(21) Appl. No.: 11/424,676

(22) Filed: Jun. 16, 2006

(65) Prior Publication Data

US 2007/0044966 A1  Mar. 1, 2007

Related U.S. Application Data

(60) Provisional application No. 60/712,889, filed on Aug. 31, 2005, provisional application No. 60/729,254, filed on Oct. 21, 2005.

(51) Int. Cl.
*E21B 33/12* (2006.01)

(52) U.S. Cl. ......................... 166/387; 166/179; 166/287

(58) Field of Classification Search .................. 166/387, 166/287, 179
See application file for complete search history.

(56) References Cited

U.S. PATENT DOCUMENTS

| | | |
|---|---|---|
| 4,272,384 A | 6/1981 | Martin |
| 4,741,401 A | 5/1988 | Walles et al. |
| 4,848,467 A | 7/1989 | Cantu et al. |
| 4,957,165 A | 9/1990 | Cantu et al. |
| 4,986,355 A | 1/1991 | Casad et al. |
| 5,215,147 A | 6/1993 | Grego et al. |
| 5,373,901 A | 12/1994 | Norman et al. |
| 5,382,371 A * | 1/1995 | Stahl et al. .................... 507/221 |
| 5,497,830 A | 3/1996 | Boles et al. |
| 5,604,186 A | 2/1997 | Hunt et al. |
| 5,624,886 A | 4/1997 | Dawson et al. |
| 6,059,032 A | 5/2000 | Jones |
| 6,357,527 B1 | 3/2002 | Norman et al. |
| 6,814,144 B2 * | 11/2004 | Jones .......................... 166/281 |
| 6,883,608 B2 | 4/2005 | Parlar et al. |
| 7,204,312 B2 * | 4/2007 | Roddy et al. .................. 166/307 |
| 7,461,695 B2 * | 12/2008 | Boney et al. .................. 166/278 |
| 2003/0196808 A1 | 10/2003 | Blauch et al. |
| 2004/0087448 A1 | 5/2004 | Smith et al. |
| 2004/0094299 A1 | 5/2004 | Jones |
| 2004/0231845 A1 | 11/2004 | Cooke |
| 2005/0039917 A1 | 2/2005 | Hailey |
| 2005/0205266 A1 * | 9/2005 | Todd et al. .................... 166/376 |
| 2006/0032633 A1 | 2/2006 | Nguyen |
| 2006/0073986 A1 | 4/2006 | Jones et al. |

* cited by examiner

*Primary Examiner* — Nicole Coy
(74) *Attorney, Agent, or Firm* — Michael Flynn; Robin Nava; Charlotte Rutherford

(57) ABSTRACT

Methods for creating packers at a desired location or locations within a wellbore for use in specific wellbore applications. A slurry of fluid medium and hydrolysable particulate matter is flowed to a downhole position and dehydrated. At this location, the particulate matter is released from the fluid medium and accumulated. The continual accumulation of the slurry and consequent deposition of particulate matter creates a degradable packer at the desired location within the wellbore. The particulate matter may be formed of an acid particle which may be removable, degradable, or hydrolysable under certain conditions of temperature, time, hydration, pH, and/or pressure. Either simultaneous with or subsequent to a wellbore activity, the packer is partially or completely removed from the wellbore.

27 Claims, 2 Drawing Sheets

US 8,230,936 B2

METHODS OF FORMING ACID PARTICLE BASED PACKERS FOR WELLBORES

RELATED APPLICATION DATA

This patent application is a non-provisional application based upon provisional application Ser. No. 60/712,889, filed Aug. 31, 2005, and provisional application Ser. No. 60/729,254, filed Oct. 21, 2005, and claims the benefit of the filing dates thereof.

BACKGROUND OF THE INVENTION

In numerous wellbore environments, a variety of wellbore assemblies are used for well related activities. For example, assemblies may be used in many types of well related procedures, including well stimulation, cementing, water control treatments or other procedures. In many of these well applications, a packer is used to isolate a region of the wellbore in which the desired activity or operation is conducted.

In some applications, cup type downhole packers have been utilized, and in other applications, mechanical or hydraulic packers have been employed. Cup type downhole packers have an elastomeric sealing element designed to seal against a casing wall. However, the elastomeric sealing element is subject to wear due to this contact with the casing wall and/or contact with burrs along the inside of the casing left from the creation of perforations. Cup type packers also are prone to getting lodged in the wellbore, and they present additional problems in horizontal wells due to the natural positioning of the bottom hole assembly on a low side of the hole, leaving uneven clearance on the low side relative to the high side of the hole. Mechanical and hydraulic packers also are subject to wear and damage due to burrs left from casing perforation. Additionally, such packers are more complicated, expensive and prone to failure in a sand laden environment, while offering poor performance in open hole applications.

Some packers are currently formed from particulate materials at desired locations in wellbores to isolate particular zones. However, in some applications, the material forming the packer is not readily removable and released after the particular activity is completed. Often, significant fluid pressure and volume is required to remove the packer.

Thus the need exists for materials and methods of forming and easily removing wellbore packers which isolate wellbore zones. Methods and materials that can achieve this would be highly desirable, and these needs are met at least in part by the following invention.

SUMMARY OF THE INVENTION

In general, the present invention provides compositions for and methods of creating one or more packers at a desired location or locations within a wellbore for use in specific wellbore applications. A slurry of fluid medium with particulate matter is flowed downhole and then dehydrated to form a packer. At this location, the particulate matter, which is degradable and/or hydrolysable, is released from the fluid medium, deposited, and accumulated, while the fluid is routed to another location. The continual removal of fluid and consequent deposition and accumulation of particulate matter creates a packer at the desired location within the wellbore. Once the packer is established, a variety of wellbore treatments or other applications can be conducted in the well. The particulate matter, which is removable, is degradable and/or hydrolysable under certain conditions of temperature, time, pH, and pressure. Either simultaneous with or subsequent to a wellbore activity, the packer is partially or completely removed from the wellbore.

In one embodiment of the invention, a packer is formed in a wellbore penetrating subterranean by first flowing a slurry containing a fluid medium and a hydrolysable particulate matter, and then allowing accumulation of the hydrolysable particulate matter in the wellbore. The slurry is flowed from the wellhead to at least one position in the wellbore.

In another embodiment, a degradable packer is formed in a wellbore by flowing a slurry of a fluid medium and particulate matter from the wellhead to at least one position in the wellbore, and the particulate matter accumulates at a position in the wellbore.

Also, the invention relates to degradable wellbore packers comprising hydrolysable particulate matter.

BRIEF DESCRIPTION OF THE DRAWINGS

Certain embodiments of the invention will hereafter be described with reference to the accompanying drawings, wherein like reference numerals denote like elements, and.

DETAILED DESCRIPTION OF THE PREFERRED EMBODIMENTS

Figure 1:
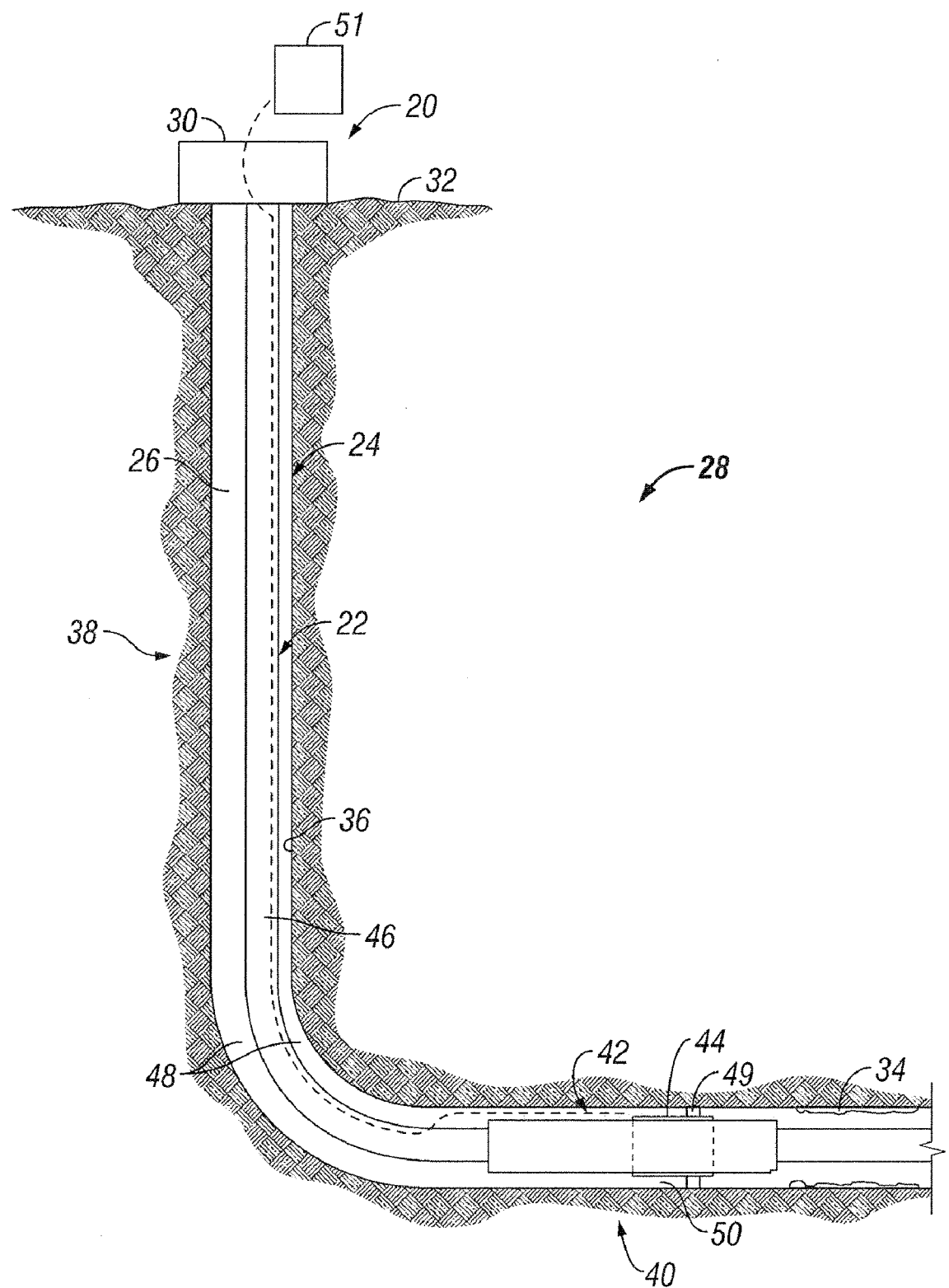
FIG. 1 is a front elevation view of a wellbore assembly disposed in a wellbore, according to an embodiment of the present invention.

The description and examples are presented solely for the purpose of illustrating the preferred embodiments of the invention and should not be construed as a limitation to the scope and applicability of the invention. It will be understood by those of ordinary skill in the art that the present invention may be practiced without these details and that numerous variations or modifications from the described embodiments may be possible. While the compositions used in the present invention are described herein as comprising certain materials, it should be understood that the composition could optionally comprise two or more chemically different materials. In addition, the composition can also comprise some components others than the ones already cited. In the summary of the invention and this detailed description, each numerical value should be read once as modified by the term "about" (unless already expressly so modified), and then read again as not so modified unless otherwise indicated in context.

The present invention generally relates to packers for wellbore applications in which the packer is partially or completely self removable by degradation and/or hydrolysis of the particle forming the packer. In some embodiments, the packer is generated in situ. This is accomplished by transporting a particulate matter to a wellbore zone or position to isolate, in a slurry form with a fluid medium, and accumulation the particulate matter. The accumulation may be accomplished by dehydrating the particulate matter. The fluid medium is separated from the particulate matter such that the particulate matter is deposited to generate the packer at the desired location or locations within the wellbore. As used herein, the term "dehydration" means substantially separating the fluid medium from the particulate matter, notwithstanding the actual composition of the fluid medium. Slurry dehydration may be accomplished by a variety of techniques, including taking a return flow of the fluid medium through the wellbore assembly tubing, e.g. coiled tubing, drill pipe or jointed tubing. The dehydration also may be created by a properly positioned choke, by creating a tight annular clearance, by a cup style packer, by combinations of these mechanisms or by other appropriate mechanisms, as described more fully below.

The packer may form by settling, or accumulation, of the particulate matter by a process of dehydrating the slurry. When the packer is formed from settling, or accumulation, a cup, choke, or other apparatus may be provided which enhances or enables dehydration. The particulate matter may even accumulate or settle upon natural formations within the wellbore and/or adjacent subterranean formation. Also, the packer may be formed at a position within a wellbore where at least one perforation into the subterranean formation adjacent the wellbore has been made. The slurry may then be flowed from the wellhead to the perforation(s), and the packer forms through slurry dehydration by squeezing the fluid medium into the formation while substantially blocking movement of particulate matter into the formation. The dehydration may be accomplished using perforations in combination with any other dehydration mechanisms as well.

Simultaneous with, or subsequent to, a particular wellbore activity, the packer is self removed, as the particulate matter used to form the packer generally comprises an acid particle which degrades, clears, or releases upon exposure to particular factors. Also, eliminating the condition causing dehydration of the slurry may be used to assist in removing the packer.

The fluid medium used to form the packer may include a liquid, such as an aqueous liquid. In some embodiments, the fluid medium is simply any readily available aqueous liquid, water, or even aqueous brine. Also, the fluid medium may be a liquid mixed concomitantly with a gas component (most commonly nitrogen, carbon dioxide, argon, air or their mixtures) in the presence of a suitable surfactant, to form a fluid medium which is foam or an energized fluid. The dispersion of the gas component into the base fluid in the form of bubbles may increase the viscosity of the fluid medium thus impacting positively its transporting performance, for example, the capacity to carry particulate matter which forms a packer. The presence of the gas component may also enhance the flowback of the fluid medium from the wellbore, due to the expansion of such gas once the pressure is reduced.

As used herein, the term "liquid" is meant to include all components of the composition except any gas component. The term "gas component" is used herein to describe any component in a gaseous state or in a supercritical state, wherein the gaseous state refers to any state for which the temperature of the composition is below its critical temperature and the pressure of the composition is below its vapor pressure, and the supercritical state refers to any state for which the temperature of the composition is above its critical temperature. The terms "foam" and "energized fluid" are used interchangeably to describe any relatively stable mixture of gas component and liquid, notwithstanding the foam quality value, i.e. the ratio of gas volume to the total volume of gas component and liquid. In the art however, if the foam quality is above 52%, the fluid is conventionally called foam, and below 52%, an energized fluid. Since gas volume is known to decrease substantially with applied pressure and increase moderately with applied temperature, the resulting foam quality will also depend upon the temperature and pressure of the foam composition.

When a foamed fluid or energized fluid medium are used according to the invention, a surfactant, or blend of surfactants, is useful for forming the foam. Any surfactant able to aid the dispersion and/or stabilization of the gas component into the fluid to form a foam that is readily apparent to those skilled in the art may be used. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, α-olefin sulfonates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanent positively charged moiety in the molecule regardless of pH and a negatively charged moiety at alkaline pH. In some embodiments of the invention, the surfactant is a cationic, zwitterionic or amphoteric surfactant containing an amine group or a quaternary ammonium group in its chemical structure ("amine functional surfactant"). A particularly useful surfactant is the amphoteric alkyl amine contained in the surfactant solution Aquat 944® (available from Baker Petrolite of 12645 W. Airport Blvd, Sugar Land, 77478 USA). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used.

Methods and compositions of the invention are useful for forming packers for conducting activities in vertical and horizontal wellbores. Prior to, during or after creation of the packer, additional aspects of the wellbore application can be conducted. For example, perforation procedures, formation stimulation techniques, acidizing, cementing applications, or water control treatments can be accomplished.

The ability to generate the packer enables adaptation of the packer to casing size and condition variations as well as to open hole applications or applications within external screens or other tubular components. Also, the packer is self-healing in the sense that the packer continues to build as long as particular matter is transported to the desired area. Multiple packers can be generated with a single trip into the wellbore thus saving costs and often simplifying the procedure. For example: a BHA initially can be moved to a desired location in wellbore; a packer is then built; a well related procedure is carried out; the BHA is then moved to another location;

another packer is built; a subsequent well related procedure is carried out; and this process is repeated as many times as desired during the single trip into the wellbore. The packer can be a single entity, separating the upper well region from the lower well region, or could be a straddle system, where two separate entities isolate an interval from both the upper well region and lower well region.

In some embodiments, the particulate matter used to form the packer comprises a solid acid particle which degrades, melts, hydrolyzes, or releases upon exposure to particular factors. Such factors include, but are not necessarily limited to time, temperature, pressure, hydration, or pH. As used herein, the term "acid particle" means an acid material which may be an acid monomer in an amorphous or crystalline solid state (solid acid), an acid contained within an solid capsule, shell, or coating (encapsulated acid), and the like. An acid particle may also comprise a polyacid in a solid form, amorphous or crystalline, which is the condensation product of certain organic acid precursors (acid monomers). Such organic acids are condensed by removal of water to form the polyacid.

The acid particle matter may be of any suitable particle size, range of particle size, grade of particles, or plurality of particle sizes, ranges, or grades, to achieve packers according to the invention. For example, a 20 mesh particle could be blended with a 40 mesh particle to achieve packers with unique strength, size, degradation, or other properties.

Acid particles useful in some embodiments of the invention may be solid acids or encapsulated acids. Any suitable acid may be used. Examples of suitable acids for forming acid particles of the invention, which may be either solid acids or encapsulated acids, include, but are not limited to, hydrochloric acid, sulfuric acid, phosphoric acid, phosphoric acid, nitric acid, formic acid, acetic acid, sulfamic acids, citric acid, glycolic acid, maleic acid, boric acid, oxalic acid, sulfamic acid, fumaric acid, lactic acid, other mineral acids, other organic acids, and the like. Sulfamic acid, boric acid, citric acid, oxalic acid, maleic acid, and the like, are some examples of suitable solid acids forming solid acid particles. When encapsulated, the acids may be encapsulated in accordance with the methods described in U.S. Pat. Nos. 5,373,901, 5,604,186, and 6,357,527 and U.S. patent application Ser. No. 10/062,342, filed on Feb. 1, 2002 and entitled "Treatment of a Well with an Encapsulated Liquid and Process for Encapsulating a Liquid," each of which is incorporated by reference herein in its entirety.

Processes for encapsulating solids are well known. For example, some encapsulated solids suitable for use in the current invention are readily available from the Balchem Corporation, P.O. Box 175, Slate Hill, N.Y. 10973 (Balchem). Currently, Balchem markets encapsulated citric acid under the brand name CAP-SHURE®. Balchem markets several forms of CAP-SHURE® which are suitable for use in the current invention. Three versions currently available are CAP-SHURE® CITRIC ACID C-165-85, CAP-SHURE® CITRIC ACID C-165-63 and CAP-SHURE® CITRIC ACID C-150-50. Each product has a semi-permeable membrane formed from partially hydrogenated vegetable oil. The semi-permeable membrane has a melting point ranging from 59° C. to 70° C.

Some acid particles useful in the invention hydrolyze under known and controllable conditions of temperature, time and pH to evolve the organic acid precursors. Any acid particle which is prone to such hydrolysis may be used in the invention. One example of a suitable acid particle is a solid polyacid formed from the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of glycolic acid (known as "glycolide"), which has a melting point of about 86° C. Yet another example suitable as solid acid-precursors are those polymers of hydroxyacetic acid (glycolic acid) ("PGA"), with itself or other hydroxy-, carboxylic acid-, or hydroxycarboxylic acid-containing moieties described in U.S. Pat. Nos. 4,848,467; 4,957,165; and 4,986,355. Another example is a copolymer of lactic acid and glycolic acid. These polymers and copolymers are polyesters. A particular advantage of these materials is that the solid polyacids and the generated acids are non-toxic and are biodegradable. The solid polyacids are often used as self-dissolving sutures.

Acid particles may be manufactured in various solid shapes, including, but not limited to spheres, granules, fibers, beads, films, ribbons, strips, platelets, and the like. The acid particles may be coated to slow hydrolysis in order to delay degradation until the slurry has formed the packer. Such coating materials are widely known in the art. See U.S. Pat. Nos. 4,741,401, 5,497,830 and 5,624,886, incorporated herein by reference. Suitable coatings include, by non-limiting example, polycaprolate (a copolymer of glycolide and epsilon-caprolactone), and calcium stearate, both of which are hydrophobic. Polycaprolate itself slowly hydrolyzes. Generating a hydrophobic layer on the surface of the acid particle, or solid acid-precursor, by any means delays the hydrolysis. Note that coating here may refer to encapsulation or simply to changing the surface by chemical reaction or by forming or adding a thin film of another material. The hydrolysis of the acid particle does not substantially occur until at least the time water contacts the acid particle.

Mixtures of one or more acid particles may be purely physical mixtures of separate particles of separate components. The mixtures may also be manufactured such that one or more acid particle and one or more solid acid-reactive materials is in each particle; this will be termed a "combined mixture". This may be done, by non-limiting example, by coating the acid particle material with a solid acid-precursor, or by heating a physical mixture until the solid acid-precursor melts, mixing thoroughly, cooling, and comminuting. For example, it is common practice in industry to co-extrude polymers with mineral filler materials, such as talc or carbonates, so that they have altered optical, thermal and/or mechanical properties. Such mixtures of polymers and solids are commonly referred to as "filled polymers". In any case it is preferable for the distribution of the components in the mixtures to be as uniform as possible. The choices and relative amounts of the components may be adjusted for the situation to control the acid particle hydrolysis rate.

The amount of acid particle, or mixture, used in the particulate matter will be dependent upon the particular requirements and environment presented. The particulate matter may comprise any suitable amount of acid particles, and is mixed with the fluid medium to form the slurry. The fluid medium is typically any aqueous medium readily available at the job site. The preferred concentration range of acid particles is between from about 0.4 ppg and about 8.3 ppg (between about 0.05 and about 1.0 kg/L). The most preferred range is between about 0.8 ppg and about 2.5 ppg (between about 0.1 and about 0.3 kg/L). One skilled in the art will know that for a given particle shape, flow rate, rock properties, etc. there is a concentration, that can be calculated by one of ordinary skill in the art, at which the packer will be formed.

The degradation of acid particles may also be accelerated or delayed by the addition of certain soluble liquid additives.

These accelerants may be acids, bases, or sources of acids or bases. These are particularly valuable at low temperatures (for example below about 135° C.), at which solid acid-precursors, for example, hydrolyze slowly, relative to the time an operator would like to put a well on production after a fracturing treatment. Non-limiting examples of such soluble liquid additives that hydrolyze to release acids are esters (including cyclic esters), diesters, anhydrides, lactones and amides. A compound of this type, and the proper amount, that hydrolyzes at the appropriate rate for the temperature of the formation and the pH of the fracturing fluid is readily identified for a given treatment by simple laboratory hydrolysis experiments. Other suitable soluble liquid additives are simple bases. (They are termed "liquids" because in practice it would be simpler and safer to add them to the fluid medium as aqueous solutions rather than as solids.) Suitable bases are sodium hydroxide, potassium hydroxide, and ammonium hydroxide. Other suitable soluble such as alkoxides, carbonates, sulfonates, phosphates, and bicarbonates, as well as alcohols such as but not limited to methanol and ethanol, alkanol amines and organic amines such monoethanol amine and methyl amine, may be used. Other suitable soluble liquid additives are acids, such as but not limited to, aminopolycarboxylic acids (such as but not limited to hydroxyethylimino-diacetic acid), polyaminopolycarboxylic acids (such as but not limited to hydroxyethylethylenediaminetriacetic acid), salts—including partial salts—of the organic acids (for example, ammonium, potassium or sodium salts), and mixtures of these acids or salts. The organic acids may be used as their salts. When corrosive acid might contact corrodible metal, corrosion inhibitors are added.

In addition to acid particles, the particulate matter may also comprise other suitable materials to form the packer. Examples of such materials include, but are not limited to, sand, walnut shells, sintered bauxite, glass beads, ceramic materials, naturally occurring materials, or similar materials. Mixtures of any of these may be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc.

Referring now generally to FIG. 1, a system 20 is illustrated according to an embodiment of the present invention. In the particular embodiment illustrated, system 20 comprises a wellbore assembly 22 disposed in a well 24 formed by a wellbore 26 drilled into a formation 28. Formation 28 may hold desirable production fluids, such as oil. Wellbore assembly 22 extends downwardly into wellbore 26 from a wellhead 30 that may be positioned along a surface 32, such as the surface of the earth or a seabed floor. The wellbore 26 may comprise open hole sections, e.g. open hole section 34, cased sections lined by a casing 36, or a combination of cased sections and open hole sections. Additionally, wellbore 26 may be formed as a vertical wellbore or a deviated, e.g. horizontal, wellbore. In the embodiment illustrated in FIG. 1, wellbore 26 comprises a vertical section 38 and a deviated section 40 which is illustrated as generally horizontal. Packers can be generated in either or both vertical sections and deviated sections of wellbore 26.

In the example illustrated, wellbore assembly 22 comprises an operational assembly 42, such as a bottom hole assembly, having a dehydration device 44. Wellbore assembly 22 supports the dehydration device 44 on a tubing 46, such as coiled tubing, drill pipe or jointed tubing. The wellbore assembly 22 creates a surrounding annulus 48 that extends, for example, along the exterior of at least tubing 46 and often along at least a portion of operational assembly 42 to dehydration device 44. The dehydration device 44 may comprise a variety of mechanisms or combinations of mechanisms 49. Examples of mechanisms 49 include chokes, screens, cup style packers, annular orifices, sealing elements, a tighter clearance 50 between the dehydration device and a surrounding wall, and other mechanisms able to direct the slurry flow such that fluid medium is separated from the particulate matter. For example, the dehydration device can be used to create a pressure drop that encourages fluid flow through a screen sized to block particular matter in the slurry.

Well related parameters can be tracked by a control system 51, such as a computer-based control system. Control system 51 can be used to collect data, such as temperature and pressure data, in real-time. The data is collected from the well to provide an indication or roadmap as to the progress of various procedures. For example, control system 51 can be used to monitor the creation and elimination of packers at multiple levels within the wellbore.

It should be noted that use of the terminology down, downward, downwardly or up, upward or upwardly reflects relative positions along wellbore 26. Regardless of whether the wellbore is vertical or horizontal, down, downward or downwardly mean further into the wellbore relative to wellhead 30, and up, upward or upwardly mean a position along the wellbore that is closer to the wellhead 30 relative to a given reference point.

Figure 2:
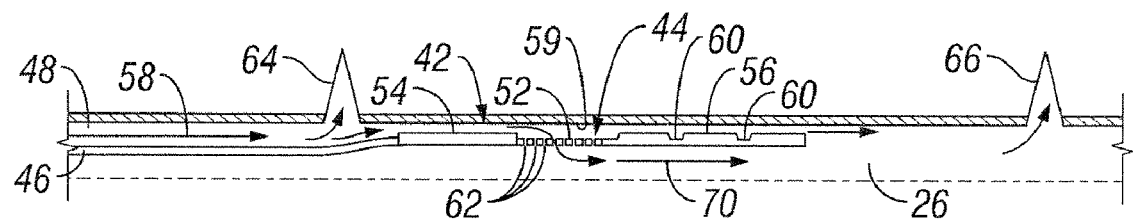
FIG. 2 is a schematic illustration of an embodiment of a portion of the wellbore assembly deployed at a desired location in the wellbore, according to an embodiment of the present invention.

In the embodiment illustrated in FIG. 2, dehydration device 44 comprises a screen 52 positioned between a pack seal area 54 and a choke 56. Effectively, dehydration device 44 comprises screen 52 and choke 56 which cooperate to separate slurry 58. The slurry, indicated by arrow 58, is formed of a fluid medium and particulate matter that is flowed downwardly through annulus 48 along tubing 46 and pack seal area 54. The annulus 48 is defined at its exterior by a wall 59 that may be formed by the formation in an open hole section, by casing 36, by an outlying screen section, such as a gravel pack screen, or by another surface radially spaced from and surrounding at least a portion of operational assembly 42.

As the slurry 58 flows along screen 52, the fluid medium portion moves through screen 52 causing the consequent deposition of particulate matter. Some of the slurry also may flow past screen 52, but choke 56 is designed to create a pressure drop that encourages flow through screen 52 rather than flow down the annulus surrounding choke 56. A plurality of annular rings 60 can be formed in choke 56 to further encourage passage of the fluid medium through screen 52. In this embodiment, screen 52 comprises openings 62 that allow the fluid to pass through while preventing the particulate matter from entering the inside of the screen. In this application, dehydration device 44 is positioned between an upper perforation 64 and a lower perforation 66.

Figure 3:
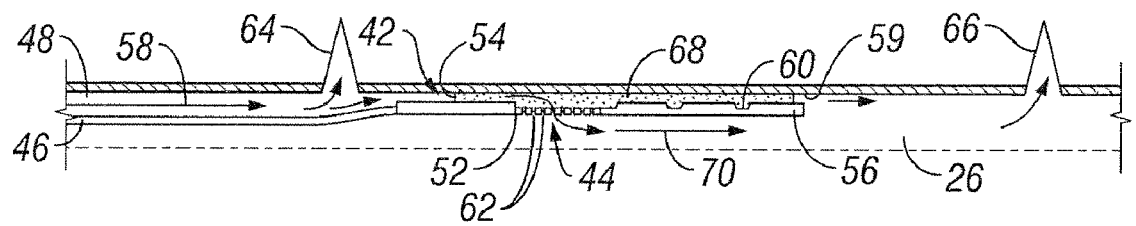
FIG. 3 is a schematic illustration of the embodiment illustrated in FIG. 2 with a packer formed, according to an embodiment of the present invention.
Figure 4:
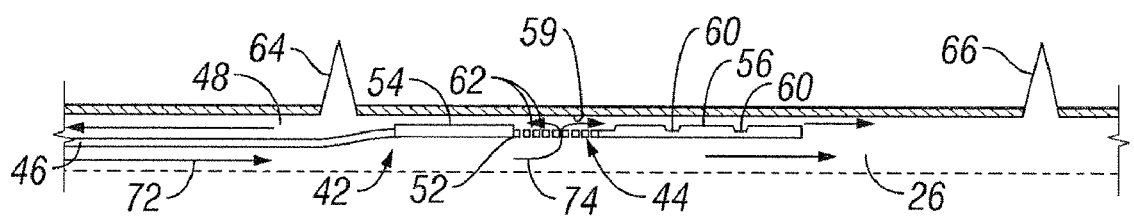
FIG. 4 is a schematic illustration of the embodiment of FIG. 2, wherein fluid flow is redirected upwardly, according to an embodiment of the present invention.

Once dehydration device 44 is positioned at a desired location within wellbore 26, slurry 58 is flowed downwardly through annulus 48 and a packer 68 begins to build over choke 56, as illustrated in FIG. 3. The packer 68 then continues to expand upward to cover screen 52 and then pack seal area 54. When dehydration device 44 is located in a horizontal or other type of deviated wellbore, packer 68 continues to build as long as the flow velocity over pack seal area 54 is sufficient to carry sand to the top of the packer. In this embodiment, slurry 58 is delivered to the desired area along a first flow path, and the separated fluid medium is directed along a second flow path which is routed downwardly through assembly 42, as indicated by arrows 70. Or as shown in FIG. 4, the flow can be redirected back up the conduit 46, and following the flow path as indicated by 72. As the packer builds, fluid medium flow through the packer is reduced. Packer 68 is readily built in several types of locations, including in an annulus defined on its exterior by an open hole section, a cased section or a screen section, e.g. a gravel pack screen.

Before, during and/or after generation of packer 68, other aspects of the wellbore application can be completed. For example, perforation procedures (normally done before generation of packer 68), formation stimulation techniques, cementing applications, or water control treatments can be implemented. When the application at that wellbore location is completed, packer 68 can be eliminated, and assembly 42 can be withdrawn from the wellbore or moved to another location in the wellbore for creation of another packer 68. The ability to generate and eliminate packers enables multi-layer applications within a wellbore without removal of wellbore assembly 22.

Thus, various well related procedures can be carried out in different zones between or during the sequential building of packers along the wellbore. For example, packer 68 can be formed at one location to enable treatment of the well interval. The packer is then cleared, and assembly 42 is moved to the next desired wellbore location, e.g. an adjacent zone. At that location, another packer 68 is formed and a well treatment is carried out. Packer 68 can be repeatedly formed and unset at multiple locations, e.g. levels, within the well.

As mentioned hereinabove, the degradation characteristic of some acid particles makes time-release packers possible. For example, the packer 68 can be formed in the wellbore. Then after exposure over time to certain factors, i.e. water in the presence or temperature, the packer 68 begins to degrade, ultimately releasing. Formation and time-release of packer 68 may also be conducted for a plurality of zones, either simultaneously or concurrently.

According to one method, assembly 42 is moved downhole to a desired perforation location. A perforation tool is then used to form perforations, followed by the building of packer 68 below the perforations. Subsequently, a fracturing procedure or other procedure is performed. Once the procedure is completed, assembly 42 is moved to another wellbore location, e.g. a location upward from the previously formed perforations, and the perforation tool is used again to form perforations in another zone. Another packer 68 is built below the perforations, and a procedure such as fracturing is carried out. This process can be repeated at multiple zones. It should be noted that in some applications, packer 68 is washed or flushed away at least partially before moving assembly 42.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method comprising:
deploying at least one screen downhole via a tubing;
flowing a slurry comprising an aqueous fluid medium and a hydrolysable particulate matter downwardly along and through an annulus surrounding the tubing from a wellhead to the screen; and
forming a packer by accumulation of the hydrolysable particulate matter at a position in the wellbore.

2. The method as recited in claim 1, wherein the packer forms by passing the fluid medium through the screen while substantially blocking movement of the particulate matter through the screen.

3. The method as recited in claim 1, further comprising creating at least one perforation in a subterranean formation adjacent the wellbore, wherein the slurry is flowed from the wellhead to the perforation, and wherein the packer forms by squeezing the fluid medium into the formation while substantially blocking movement of the particulate matter into the formation.

4. The method as recited in claim 1, wherein the slurry is flowed from the wellhead to a position in the wellbore, and wherein the packer forms by dehydration of the slurry comprising the particulate matter.

5. The method as recited in claim 1, further comprising providing at least one accumulation mechanism for accumulating the particulate matter, and wherein the packer forms by settling of the particulate matter.

6. The method as recited in claim 1, wherein the hydrolysable particulate matter is selected from the group consisting of solid acid, encapsulated acid, lactic acid, polylactic acid, glycolic acid, or polyglycolic acid, or any mixture thereof.

7. The method as recited in claim 1, wherein a time-release bridge packer is formed.

8. The method as recited in claim 7, wherein the bridge packer degrades over a time period.

9. The method as recited in claim 1, wherein a degradable bridge packer is formed.

10. The method as recited in claim 9, wherein the hydrolysable particulate matter comprises encapsulated citric acid, encapsulated lactic acid, encapsulated polylactic acid, encapsulated glycolic acid, or encapsulated polyglycolic acid, or any mixture thereof.

11. The method as recited in claim 9, further comprising exposing the packer to a factor which provides packer degradation.

12. The method as recited in claim 11, wherein the factor is time, pH, temperature, hydration, or pressure, or any combination thereof.

13. The method as recited in claim 1, wherein the particulate material further comprises sand.

14. The method as recited in claim 1, wherein the particulate material further comprises an encapsulating coating impeding hydrolysis.

15. The method as recited in claim 1, further comprising directing the fluid medium that passes through the screen downwardly into the wellbore.

16. The method as recited in claim 1, further comprising directing the fluid medium that passes through the screen upwardly through an interior of the tubing.

17. The method as recited in claim 1, further comprising backwashing through the screen to assist in eliminating the packer.

18. The method as recited in claim 1, further comprising locating a choke below the screen.

19. The method as recited in claim 1, wherein the particulate material further comprises a base.

20. The method as recited in claim 19, wherein the base is selected from the group consisting of alkali metal sulfonates, alkali metal carbonates, alkali metal bicarbonates, alkali metal phosphates, and any mixtures thereof.

21. The method as recited in claim 1, wherein concentration of hydrolysable particulate matter is from about 0.42 ppg and about 8.34 ppg (between about 0.05 and about 1.0 kg/L).

22. The method as recited in claim 1 further comprising performing at least one wellbore activity.

23. The method as recited in claim 22, wherein the wellbore activity comprises at least one of acidizing, cementing, a perforation procedure, a formation stimulation technique, and a water control treatment, and further comprising degrading the hydrolysable particulate matter to form an acid, wherein degrading occurs at a one of simultaneous with or subsequent to the wellbore activity.

24. A method comprising:
deploying at least one screen downhole via a tubing;
flowing a slurry comprising an aqueous fluid medium and a particulate matter downwardly along and through an annulus surrounding the tubing from a wellhead to the screen;
forming a packer by accumulation of the particulate matter at a position in the wellbore; and,
wherein the particulate matter is a solid acid, encapsulated acid, lactic acid, polylactic acid, glycolic acid, polyglycolic acid, encapsulated citric acid, encapsulated lactic acid, encapsulated polylactic acid, encapsulated glycolic acid, or encapsulated polyglycolic acid, or any mixture thereof.

25. The method as recited in claim 24, further comprising performing at least one wellbore activity.

26. The method as recited in claim 25, wherein the wellbore activity comprises at least one of acidizing, cementing, a perforation procedure, a formation stimulation technique, and a water control treatment, and further comprising degrading the particulate matter to form an acid, wherein degrading occurs at a one of simultaneous with or subsequent to the wellbore activity.

27. The method as recited in claim 24, wherein the packer forms by passing the fluid medium through the screen while substantially blocking movement of the particulate matter through the screen.

* * * * *